United States Patent
Feldbeine et al.

(10) Patent No.: US 11,128,981 B2
(45) Date of Patent: Sep. 21, 2021

(54) CELLULAR NETWORK DELIVERY OF TRAVEL SAFETY ALERTS

(71) Applicant: Verizon Patent and Licensing Inc., Arlington, VA (US)

(72) Inventors: Eldar Feldbeine, Aventura, FL (US); Mohamed Javid, Cumming, GA (US); Thomas George Ancheriyil, Sandy Springs, GA (US); Bhuvana Lalitha Namasivayam, Cumming, GA (US); Anjjan Sathia Narayan, Sandy Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

(21) Appl. No.: 16/551,230

(22) Filed: Aug. 26, 2019

(65) Prior Publication Data

US 2021/0067905 A1    Mar. 4, 2021

(51) Int. Cl.
    *H04W 4/02*      (2018.01)
    *G01S 19/43*     (2010.01)
    *H04W 64/00*     (2009.01)
    *H04W 4/90*      (2018.01)
    *G06N 20/00*     (2019.01)
    *G01C 21/34*     (2006.01)
    *H04W 68/00*     (2009.01)
    *H04W 4/021*     (2018.01)

(52) U.S. Cl.
    CPC ........ *H04W 4/023* (2013.01); *G01C 21/3423* (2013.01); *G01S 19/43* (2013.01); *G06N 20/00* (2019.01); *H04W 4/021* (2013.01); *H04W 4/90* (2018.02); *H04W 64/006* (2013.01); *H04W 68/005* (2013.01)

(58) Field of Classification Search
    CPC ..... H04W 4/023; H04W 4/90; H04W 68/005; H04W 4/021; H04W 64/006; G01C 21/3423; G01C 21/3691; G01C 21/3697; G01S 19/43; G06N 20/00; G08G 1/096725; G08G 1/096716; G08G 1/096775; G08G 1/096741; G08G 1/0133; G08G 1/0141; G08G 1/012; G08G 1/164; G08G 1/166; B60W 60/00
    See application file for complete search history.

(56) References Cited

U.S. PATENT DOCUMENTS

| | | | |
|---|---|---|---|
| 9,659,496 B2 * | 5/2017 | Massey ................ | G08G 1/012 |
| 10,959,041 B1 * | 3/2021 | Burcham ............... | G06F 16/29 |
| 2016/0304028 A1 * | 10/2016 | Hathaway .............. | G08G 1/04 |
| 2017/0161614 A1 * | 6/2017 | Mehta ................... | G06N 20/00 |
| 2018/0217603 A1 * | 8/2018 | Kwon .................... | H04L 67/12 |

* cited by examiner

Primary Examiner — Marcos L Torres

(57) ABSTRACT

A safety platform may receive travel information associated with a first cellular device. The safety platform may identify, based on the travel information associated with the first cellular device, one or more other cellular devices that are located within a distance threshold from the first cellular device. The safety platform may determine that a second cellular device, of the one or more other cellular devices, is traveling on a path toward the first cellular device and at a speed that satisfies a speed threshold. The safety platform may transmit, based on determining that the second cellular device is traveling on the path toward the first cellular device and at the speed that satisfies the speed threshold, an instruction to the first cellular device to display a safety alert.

20 Claims, 13 Drawing Sheets

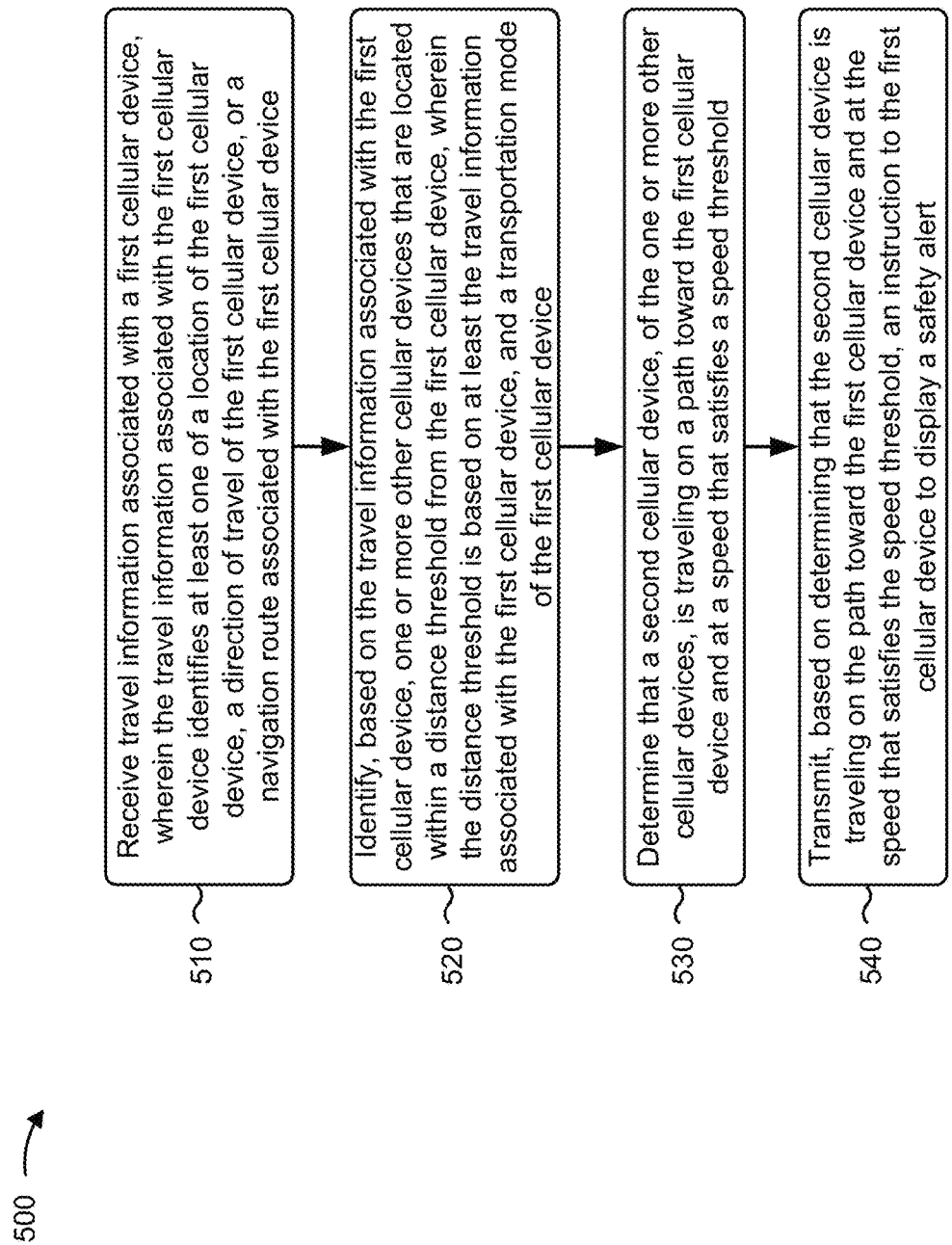

CELLULAR NETWORK DELIVERY OF TRAVEL SAFETY ALERTS

BACKGROUND

A collision avoidance system may include one or more devices that are capable of detecting potential dangerous scenarios associated with a vehicle, capable of providing safety alerts of the potential dangerous scenarios to the operator of the vehicle, capable of facilitating one or more actions of the vehicle based on the potential dangerous scenarios (e.g., automatic braking, automatic steering, and/or the like), and/or the like.

BRIEF DESCRIPTION OF THE DRAWINGS

FIG. 5 is a flow chart of an example process for cellular network delivery of travel safety alerts.

DETAILED DESCRIPTION OF PREFERRED EMBODIMENTS

Figure 1A:
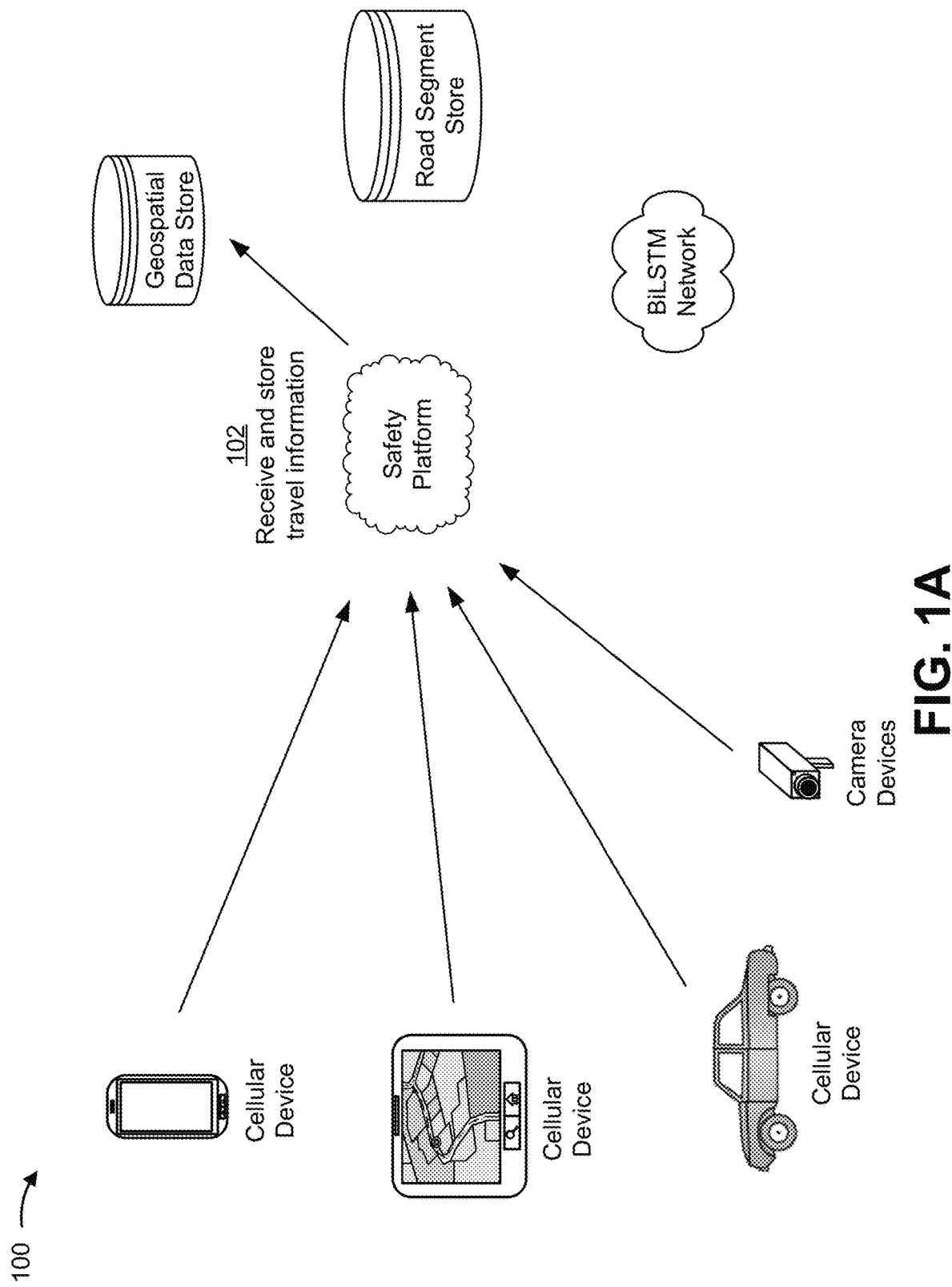
FIGS. 1A-1F are diagrams of an example implementation described herein.

The following detailed description of example implementations refers to the accompanying drawings. The same reference numbers in different drawings may identify the same or similar elements.

In some cases, a collision avoidance system may detect a potential dangerous scenario, associated with a vehicle, based on proximity detection and/or line-of-sight vision. For example, a collision avoidance system may include one or more cameras, proximity sensors, radar detectors, lidar detectors, and/or the like located in and/or around the vehicle to detect imminent collisions with other vehicles, pedestrians, and/or other objects, within a particular distance and/or within a line of sight of the vehicle. However, some potential (and/or imminent) dangerous scenarios may not be detectable, or may not be detectable in a sufficient amount of time in advance to avoid the potential dangerous scenarios, using proximity detection and/or line-of-sight vision. For example, a collision avoidance system associated with a vehicle, that detects potential dangerous scenarios based on proximity detection and/or line-of-sight vision, may not detect another vehicle that is traveling around a curve in a road toward the vehicle. As another example, the collision avoidance system may not detect another vehicle that is traveling on a different road as the vehicle and toward the same intersection as the vehicle. Moreover, while a collision avoidance system may detect potentially dangerous scenarios associated with a vehicle and/or may provide safety alerts to the operator of the vehicle, the collision avoidance system may not be capable of detecting potentially dangerous scenarios and/or providing safety alerts to pedestrians, cyclists, and/or others that are traveling by transportation modes other than by vehicle.

Some implementations described herein provide a cellular device and a safety platform that are capable of cellular network delivery of safety alerts. Instead of, and/or in addition to, using proximity detection and/or line-of-sight vision to detect potentially dangerous scenarios, the cellular device may provide travel information to the safety platform, and the safety platform may detect potentially dangerous scenarios associated with the cellular device based on the travel information associated with the cellular device as well as travel information associated with other cellular devices. Moreover, the safety platform may transmit safety alerts associated with the potentially dangerous scenarios to the cellular device via a cellular network (e.g., a fifth generation New Radio (5G/NR) network, a long term evolution (LTE) network, and/or the like) and/or other types of wireless networks.

In this way, the safety platform is capable of detecting potentially dangerous scenarios that may otherwise not be detectable based on proximity detection and/or line-of-sight vision, which increases the potentially dangerous scenario detection capability of the safety platform. Moreover, detecting potentially dangerous scenarios based on travel information associated with a cellular device permits the safety platform to provide safety alerts to cellular devices that may not be equipped with components and/or functionality to detect potentially dangerous scenarios based on proximity detection and/or line-of-sight vision. In this way, the safety platform may be permitted to provide safety alerts to pedestrians, cyclists, and/or users traveling by other types of transportation modes, which creates the ability to provide safety alerts for many different types of transportation modes.

FIGS. 1A-1F are diagrams of one or more example implementations 100 described herein. As shown in FIG. 1A, example implementations 100 may include various types of devices, such one or more cellular devices, one or more camera devices, a safety platform, a geospatial data store, a road segment store, one or more devices included in a bidirectional long short-term memory (BiLSTM) network, and/or the like.

The one or more cellular devices may include a mobile device that is capable of communicating with the safety platform via a cellular network and/or other types of wireless networks, and/or the like. In some implementations, a cellular device may communicate with the safety platform via one or more application programming interfaces (APIs) (e.g., a representational state transfer API (REST API) and/or the like), using one or more network protocols (e.g., hypertext transfer protocol (HTTP), HTTP/2, and/or the like), using one or more remote procedure calls (RPCs) (e.g., gRPC, MQTT and WebSockets, and/or the like), and/or the like.

In some implementations, a cellular device may be associated with a user, may be associated with and/or integrated into a vehicle (e.g., a user-operated vehicle, an autonomous vehicle, and/or the like), and/or the like. In some implementations, a cellular device may be configured to display and/or otherwise provide safety alerts to a user of the cellular device. For example, a cellular device may be configured with an application, a web portal, and/or the like, through which the cellular device communicates with the safety platform, and through which the cellular device displays safety alerts, plays audible safety alerts, provides haptic safety alerts, and/or the like.

In some implementations, a cellular device may be capable of generating, collecting, and/or transmitting travel information, associated with the cellular device, to the safety platform. In some implementations, the travel information associated with a cellular device may include information associated with current travel of the cellular device, such as information identifying a location of the cellular device, a direction of travel of the cellular device, a navigation route along which the cellular device is traveling, a transportation mode of the cellular device, a speed of travel of the cellular device, acceleration information associated with the cellular device, and/or other types of travel information associated with the cellular device. In some implementations, the travel information associated with a cellular device may include historical travel information associated with the cellular device, such as information identifying one or more historical locations of the cellular device, a historical direction of travel of the cellular device, a historical path of travel along which the cellular device traveled, a historical transportation mode of the cellular device, historical speed of travel information of the cellular device, historical acceleration information associated with the cellular device, and/or other types of historical travel information associated with the cellular device. In some implementations, the historical travel information may be stored for a particular quantity of points in a time duration.

In some implementations, a cellular device may generate travel information using various sensors, global navigation satellite system (GNSS) components, and/or other components. For example, a cellular device may generate travel information identifying a location of the cellular device by using a GNSS receiver to communicate with one or more GNSS satellite constellations to determine a GNSS estimated location of the cellular device. In some implementations, the cellular device may further enhance the accuracy of the GNSS estimated location by determining a real-time kinematics (RTK) corrected GNSS location of the cellular device. For example, the cellular device may be an RTK-enabled cellular device that is configured with an RTK engine that is capable of communicating with one or more RTK reference stations (e.g., a physical reference station, a virtual reference station, and/or the like) to receive reference data and to use the reference data to correct a GNSS estimated location of the cellular device. In some implementations, a cellular device may transmit an indication of a corrected GNSS location of the cellular device to the safety platform, and the safety platform may be capable of determining an RTK corrected GNSS location of the cellular device.

RTK relies on fixed and well-surveyed RTK reference stations to transmit corrections data to in-range RTK-enabled cellular devices. Because a given RTK reference station is well-surveyed, an actual position of the RTK reference station is known. Here, the RTK reference station receives satellite data from a group of (e.g., five or more) GNSS satellites, and then determines reference data needed to adjust a given GNSS satellite's estimated signal location in order to provide a more accurate physical location. A cellular device may use the corrections against the RTK reference station to make similar adjustments.

In some implementations, a cellular device may determine a direction of travel of the cellular device and/or a speed of travel of the cellular device based on a plurality of determined locations of the cellular device, based on data generated by one or more sensors associated with the cellular device (e.g., an accelerometer, a gyroscope, a compass, and/or the like), and/or the like.

The one or more camera devices may be capable of capturing images, recording video, streaming video, metadata associated with the images and/or video, and/or the like, and transmitting the images, video, and/or metadata to the safety platform, to the geospatial data store, and/or to other devices. For example, a camera device may be a smart camera, an Internet of things (IoT) device, a camera associated with a vehicle, and/or the like. The one or more camera devices may be deployed to capture images and/or record and/or stream video of a road segment, a city segment, and/or another area where pedestrians, cyclists, vehicles, and/or the like typically travel. In some implementations, a camera device may be capable of converting data associated with captured images and/or recorded video to one or more messages in basic safety message (BSM) format, personal safety message (PSM) format, and/or the like in which the data is structured based on an abstract syntax notation one (ASN.1) interface description language and/or another type of interface description language. The camera device may further be capable of transmitting the one or more messages to the safety platform via a message broker system, such as Kafka, message queuing telemetry transport (MQTT), and/or another publish-subscribe message broker system. The safety platform may retrieve the one or more messages by subscribing to message broker system topics associated with the camera device.

The geospatial data store, such as a PostGIS-based geospatial data store, a cloud-based geospatial data store, and/or the like, may be capable of storing travel information associated with the cellular devices, and/or may be capable of storing other types of geospatial information. The road segment store may be capable of storing information identifying road segments for one or more geographic areas, such as a city, a county, a state, a country, and/or the like. A road segment may include a portion of a road, street, highway, and/or the like. For example, a road segment may include a portion of a road between one or more intersecting roads, a portion of a road of a threshold length, an entire length of a road, and/or the like.

The BiLSTM network may include a plurality of BiLSTM network that are capable of training and/or using a machine learning model (e.g., a BiLSTM model and/or another type of machine learning model) to determine a transportation mode of a cellular device. Additionally and/or alternatively, the safety platform may implement the functionalities of the BiLSTM network and/or the BiLSTM network described herein. A transportation mode of a cellular device may identify a means by which the cellular device or a user of the cellular device is traveling. For example, a transportation mode may include travel by vehicle or automobile (e.g., a vehicle transportation mode), may include travel by cycle or another type of non-motorized vehicle (e.g., a cyclist transportation mode), may include travel by train (e.g., a train transportation mode), may include travel by foot or another type of non-vehicle travel (e.g., a pedestrian transportation mode), may include a stationary transportation mode (e.g., a cellular device is stationary and/or not moving), as well as transportation modes for other forms of transportation. In some implementations, a transportation mode may include subcategories of the transportation mode. For example, a vehicle transportation mode may include a car transportation mode, a bus transportation mode, a motorcycle transportation mode, and/or the like.

In some aspects, the BiLSTM network may be a distributed computing network that implements a BiLSTM machine learning model with attention and/or another type of machine learning model. The BiLSTM machine learning model may be trained (e.g., by supervised training and/or unsupervised training) on historical travel information associated with known signatures of various transportation modes. The safety platform may provide travel information, associated with a cellular device, to the BiLSTM network (and/or safety platform), and the BiLSTM network (and/or the safety platform) may perform discrete and/or distributed computations based on the travel information to determine which (if any) transportation mode the cellular device is in, using the trained BiLSTM machine learning model.

The safety platform may be capable of receiving travel information from the cellular devices, from the camera devices, and/or the like, may be capable of determining potential dangerous scenarios associated with the cellular devices, may be capable of providing safety alerts to the cellular devices via a network (e.g., a cellular network and/or other types of wired and/or wireless networks), and/or the like. In some implementations, the safety platform may host a safety service, which may be accessed via an application, a web portal, and/or the like on a cellular device. In this way, the cellular device may provide travel information to the safety platform via the application, the web portal, and/or the like, and the safety platform may provide instructions to display safety alerts via a graphical user interface (GUI) associated with the application, the web portal, and/or the like as part of the safety service.

As shown in FIG. 1A, and by reference number 102, to enable the safety platform to provide a safety service to the cellular devices, the cellular devices and/or the camera devices may provide travel information to the safety platform, and the safety platform may store the travel information in the geospatial data store. In some implementations, the travel information associated with a cellular device may include any of the current and/or historical travel information described above.

In some implementations, a cellular device may transmit travel information to the safety platform at particular time intervals, may stream the travel information to the safety platform, and/or the like. In some implementations in which a cellular device transmits travel information to the safety platform at a time interval, the duration of the time interval may be based on a proximity of the cellular device to a drivable road, a walk-able path, and/or the like. For example, the time interval may decrease as the cellular device approaches a drivable road (in which case, the cellular device may more frequently provide travel information to the safety platform) and/or may decrease as the cellular device travels away from a drivable road (in which case, the cellular device may less frequently provide travel information to the safety platform).

In some implementations, a cellular device may transmit travel information to the safety platform based on receiving instructions (e.g., based on input received from a user, based on an instruction from a navigation platform, and/or the like) to display navigation directions, based on receiving a request from the safety platform for the travel information, based on receiving an instruction from a user, based on an application associated with the safety service being launched on the cellular device, based on a login to a web portal associated with the safety service, and/or the like. Moreover, the safety platform may store the travel information in accordance with all applicable laws concerning protection of personal information. Additionally, the collection, storage, and use of such travel information may be subject to consent of the user to such activity, for example, through well known "opt-in" or "opt-out" processes, as may be appropriate for the situation and type of information. Storage and use of personal and/or travel information may be in an appropriately secure manner reflective of the type of information, for example, through various encryption and anonymization techniques for particularly sensitive information.

In some implementations, a camera device may transmit travel information to the safety platform at particular time intervals, may stream the travel information to the safety platform, may transmit and/or stream metadata associated with the travel information via a message broker, and/or the like. In some implementations, a camera device may transmit travel information to the safety platform based on receiving a request from the safety platform, based on receiving an instruction from a user, and/or the like.

In some implementations, the safety platform may store travel information in the geospatial data store based on receiving the travel information. In some implementations, the safety platform may index the travel information based on locations identified in the travel information for faster location-based queries to the geospatial data store (e.g., relative to other forms of indexing).

Since the safety platform may receive travel information from multiple sources, in some cases the safety platform may receive duplicate travel information associated with a cellular device. For example, a cellular device may provide travel information at a particular location of the cellular device, and a camera device (or another cellular device) may provide travel information for the same location or within a threshold distance from the location indicated in the travel information received from the cellular device. In this case, the safety platform may determine that the safety platform has received duplicate travel information for the location for the cellular device and may deduplicate the travel information.

As an example, the safety platform may query the geospatial data store to determine that the locations of the cellular device identified the travel information received from the cellular device and the travel information received from the camera device are the same location or may determine that the distance between the locations satisfies a distance threshold. In some implementations, the safety platform may further determine that a time at which the safety platform received the travel information from the cellular device and received the travel information from the camera device (or respective time stamps associated with the travel information from the cellular device and the travel information from the camera device) are the same time or may determine that the difference between the time at which the travel information received from the cellular device was obtained and the time at which the travel information received from the camera device was obtained satisfies a timing threshold.

The safety platform may then fit the travel information received from the cellular device, the travel information received from the camera device, as well as other travel information received from other devices that identify the same location of the cellular device (or a location of the cellular device that satisfies the distance threshold) to a machine learning model. The machine learning model may include a k-nearest neighbor (KNN) model and/or another type of machine learning model that uses weighted Minkowski distances to identify a closest match to the location of the cellular device identified in the travel information received from the cellular device. The safety platform may assign greater weight to parameters such as latitude, longitude, and/or the like, and lesser weight to other parameters such as speed of travel, direction of travel, and/or the like. The safety platform may use the machine learning model to identify or predict the K closest points to the location of the cellular device identified in the travel information received from the cellular device.

The safety platform may perform additional analysis on the identified K closest points to ensure that the K closest points are within a threshold distance of the location of the cellular device identified in the travel information received from the cellular device, and to ensure that the transportation mode that was reported in the travel information associated with the K closest points is the same transportation mode identified in the travel information received from the cellular device. The safety platform may determine that the K closest points are duplicates of the location of the cellular device identified in the travel information received from the cellular device based on determining that the K closest points are within a threshold distance of the location of the cellular device identified in the travel information received from the cellular device, and that the transportation mode that was reported in the travel information associated with the K closest points is the same transportation mode identified in the travel information received from the cellular device. In this case, the safety platform may remove the travel information associated with the K closest points from the geospatial data store to deduplicate the travel information associated with the cellular device.

Figure 1B:
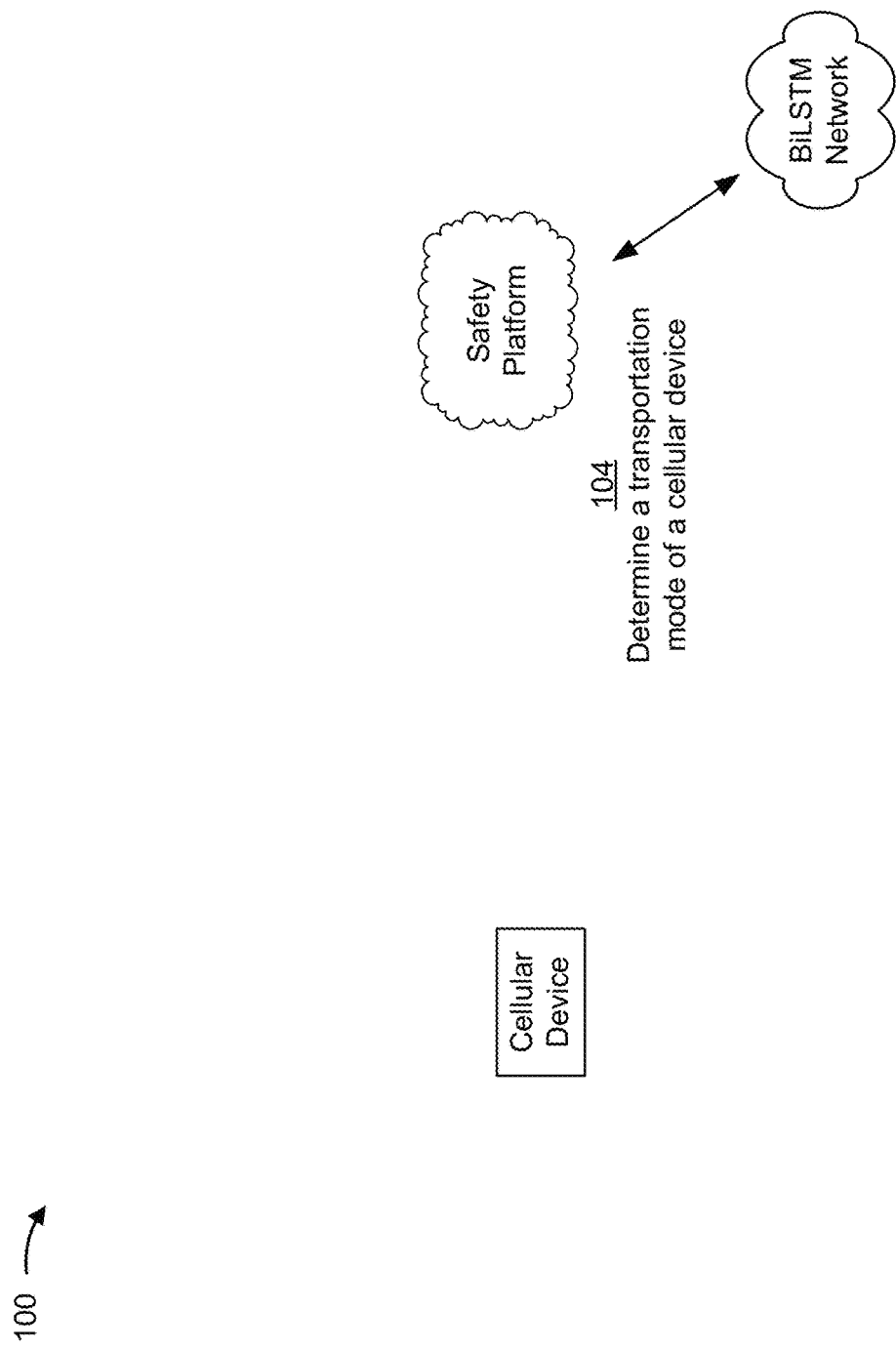

As shown in FIG. 1B, and by reference number 104, the safety platform may determine a transportation mode of a cellular device. In some implementations, the safety platform may determine a transportation mode of a cellular device based on receiving travel information from the cellular device, based on the cellular device logging onto and/or activating the safety service provided by the safety platform, and/or the like. In some implementations, the safety platform may determine a transportation mode of a cellular device prior to storing travel information, received from the cellular device, in the geospatial data store, after storing the travel information in the geospatial data store, prior to deduplicating the travel information, and/or the like.

In some implementations, the safety platform may determine a transportation mode of a cellular device based on receiving an indication of the transportation mode in travel information received from the cellular device. In some implementations, the safety platform may determine a transportation mode of a cellular device using the BiLSTM network. For example, the safety platform may provide travel information associated with the cellular device (e.g., current travel information, historical travel information, and/or the like) to the BiLSTM network, and the BiLSTM network in the BiLSTM network may determine the transportation mode of the cellular device using a BiLSTM machine learning model and/or another type of machine learning model. For example, the BiLSTM network may generate forward and backward recurrent neural network (RNN) cells based on the travel information, and may input the forward and backward RNN cells into a bidirectional dynamic RNN function to determine respective output states for the forward and backward RNN cells. The BiLSTM network may apply attention to combine the forward and backward output states, may use an adaptive learning rate optimization algorithm to apply gradients to the combined output state, and/or the like. In some implementations, the safety platform may store information identifying the transportation mode along with travel information associated with the cellular device. Additionally and/or alternatively to using the BiLSTM network to determine the transportation mode, the safety platform may execute or use a BiLSTM algorithm on the safety platform to determine the transportation mode.

Figure 1C:
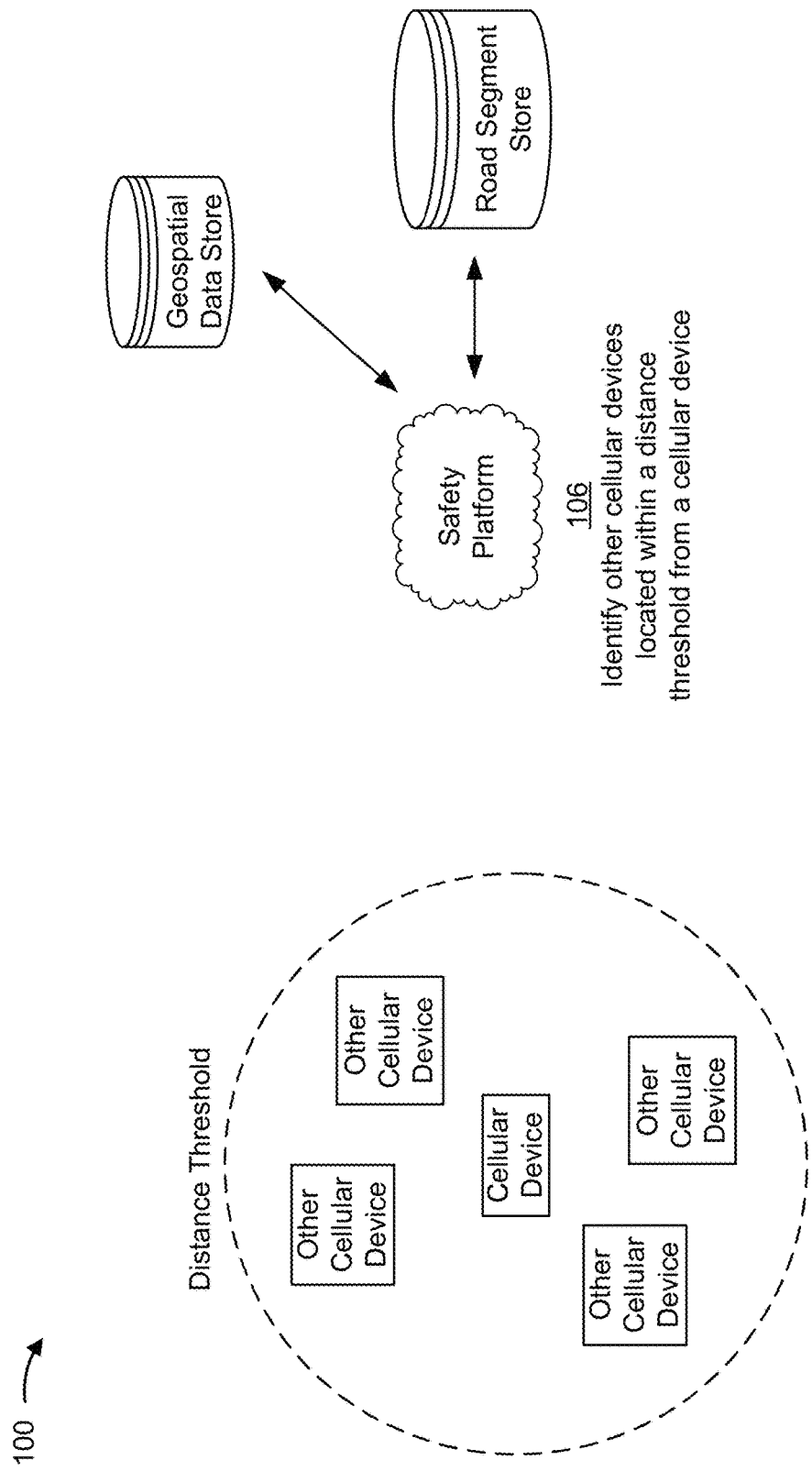

As shown in FIG. 1C, and by reference number 106, to provide safety alerts associated with a particular cellular device, the safety platform may identify other cellular devices that are located within a distance threshold from the cellular device. Additionally and/or alternatively, the safety platform may identify (e.g., based on travel information provided by the cellular device and/or the other cellular devices, based on travel information provided by one or more camera devices, and/or the like) vehicles, cyclists, pedestrians, and/or other traveling entities that may not be associated with a cellular device that is using the safety service provided by the safety platform. The safety platform may provide safety alerts to the cellular device as well as safety alerts to the other cellular devices based on detecting a potential dangerous scenario associated with the cellular device. The potential dangerous scenario may include another cellular device being associated with a vehicle that is traveling above a speed limit, that is exhibiting high acceleration in speed of travel, that is swerving, and/or that is exhibiting other potentially unsafe and/or reckless behavior.

In some implementations, the distance threshold, in which the safety platform identifies the other cellular devices, may be based on various factors. For example, the distance threshold may be based on user input received at the cellular device (e.g., via a GUI of an application or web portal associated with the safety service provided by the safety platform). The cellular device may provide an indication of the distance threshold to the safety platform.

In some implementations, the safety platform may determine the distance threshold based on travel information associated with the cellular device. For example, the cellular device may determine the distance threshold based on a transportation mode of the cellular device (e.g., the distance threshold may be a greater size, relative to a distance threshold for a pedestrian transportation mode, if the cellular device is associated with a vehicle transportation mode), a speed of travel of the cellular device (e.g., the distance threshold may increase as the speed of travel increases and/or may decrease as the speed of travel decreases), may be based on a location of the cellular device (e.g., may be based on whether the cellular device is located in a city, in a rural area, and/or the like), may be based on a direction of travel of the cellular device, and/or the like.

In some implementations, the safety platform may filter the other cellular devices based on one or more parameters, such as whether another cellular device is traveling on a same road or road segment as the cellular device, whether another cellular device is traveling on a road or road segment that intersects (e.g., within the distance threshold) a road or road segment on which the cellular device is traveling, and/or the like. In this case, the safety platform may use the information stored in the road segment store to perform map matching on the travel information associated with the cellular device and the other cellular devices to identify the nearest road or roads on which the cellular device and the other cellular devices are located. Additionally and/or alternatively, the safety platform may also detect if another cellular device is stationary on the same road and whether the emergency beacon is turned on for the other cellular device, and may alert another cellular devices accordingly.

Figure 1D:
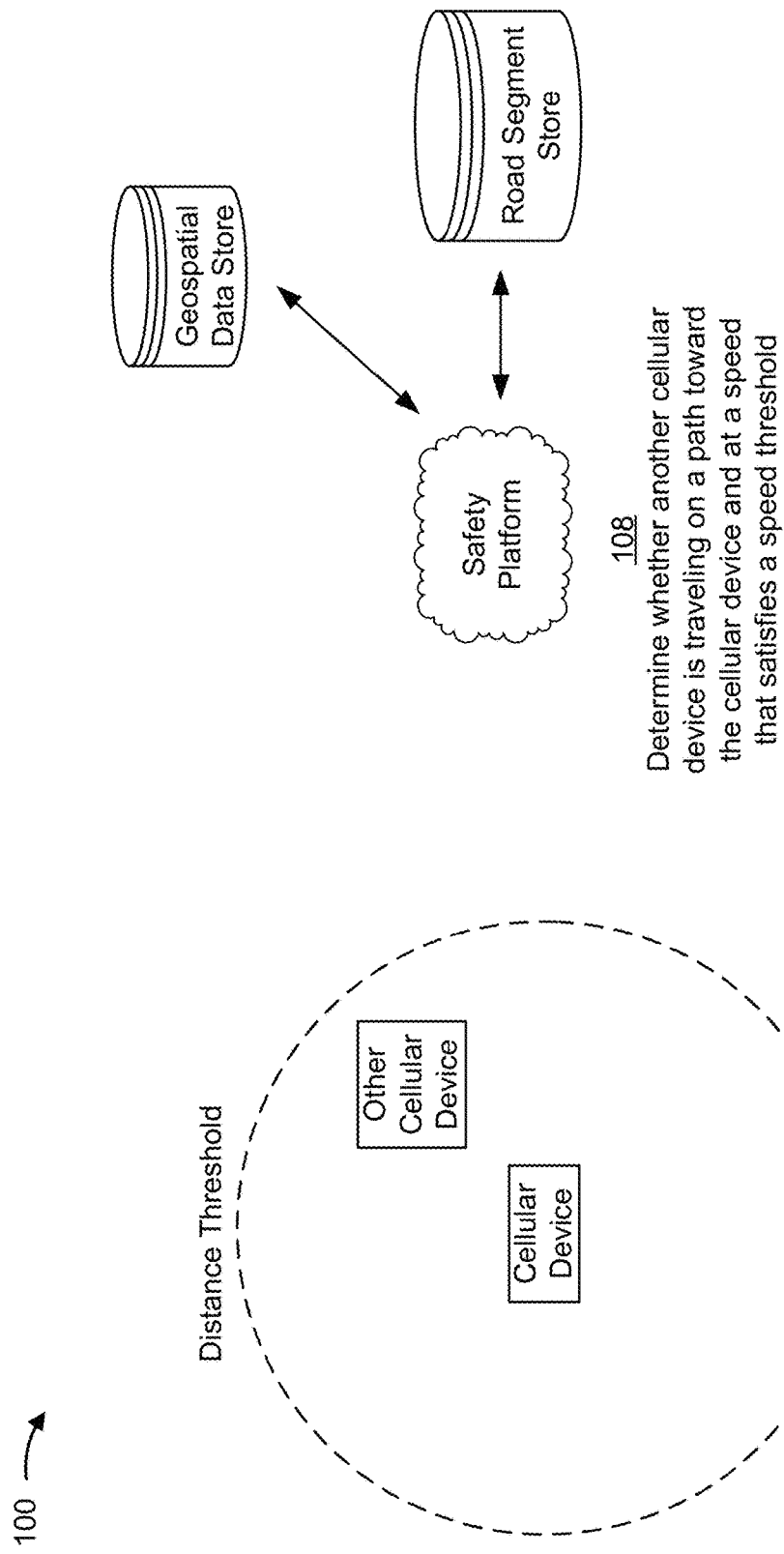

As shown in FIG. 1D, and by reference number 108, the safety platform may determine whether another cellular device (e.g., that is located within the distance threshold, that is traveling on the same road or road segment as the cellular device, that is traveling on a road or road segment that intersects the road or road segment on which the cellular device is traveling, and/or the like) is traveling on a path toward the cellular device and at a speed that satisfies a speed threshold. Additionally and/or alternatively, the safety platform may determine whether other vehicles, cyclists, pedestrians, and/or other traveling entities, that are or are not associated with other devices (e.g., other cellular devices and/or other types of devices) using the safety service provided by the safety platform, are traveling on a path toward the cellular device and at a speed that satisfies the speed threshold.

In some implementations, the safety platform may determine whether the other cellular device is traveling on a path toward the cellular device and at a speed that satisfies the speed threshold based on the respective transportation modes of the cellular device and the other cellular device. For example, the safety platform may determine that cellular device may be in a pedestrian transportation mode, a cyclist transportation mode, or a vehicle transportation mode, and may determine that the other cellular device is in a vehicle transportation mode. In this case, the safety platform may determine whether the other cellular device is traveling on a path toward the cellular device and at a speed that satisfies the speed threshold, because the vehicle associated with the other cellular device may cause a potential dangerous scenario for the user of the cellular device. Additionally and/or alternatively, the safety platform may determine whether the other cellular device (or the vehicle associated with the other cellular device) is exhibiting other potentially unsafe and/or reckless behavior described above and/or other types of potentially unsafe and/or reckless behavior that may cause a potential dangerous scenario for the user of the cellular device, such as high acceleration, large increases in acceleration, quick changes in direction of travel, swerving, and/or the like.

In some implementations, the safety platform may determine whether the other cellular device is traveling on a path toward the cellular device and at a speed that satisfies the speed threshold based on the travel information associated with the cellular device, the travel information associated with the other cellular device, and/or the like. As an example, the other cellular device may be traveling a speed that satisfies the speed threshold based on the speed of travel of the other cellular device. In some implementations, the speed threshold may be based on the transportation mode of the cellular device and/or the other cellular device, may be based on speed limits on a road or road segments on which the cellular device and/or the other cellular device are traveling, and/or the like.

As another example, the safety platform may determine whether the other cellular device is traveling on a path toward the cellular device based on the location of the cellular device, the direction of travel of the cellular device, the historical path of travel of the cellular device, a current navigation path of the cellular device, a location of the other cellular device, a direction of travel of the other cellular device, a historical path of travel of the other cellular device, a current navigation path of the other cellular device, and/or the like.

Figure 1E:
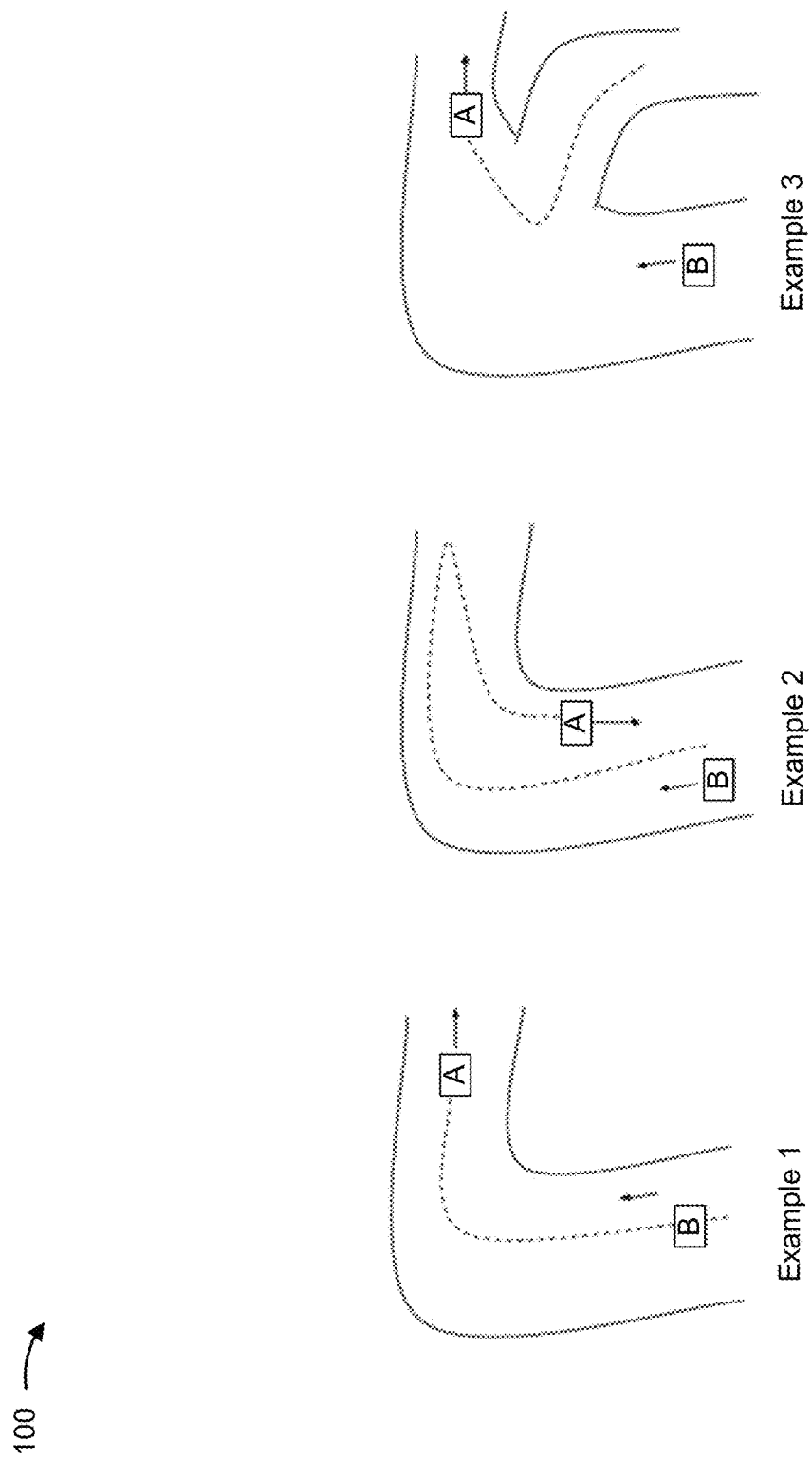

FIG. 1E illustrates various example scenarios in which the safety platform may determine whether the other cellular device is traveling on a path toward the cellular device. The safety platform may determine whether the other cellular device is traveling on a path toward the cellular device in other scenarios (i.e., scenarios not shown in FIG. 1E).

As shown in FIG. 1E, example 1 illustrates an example where the safety platform may determine whether the other cellular device is traveling on a path toward the cellular device based on the location of the cellular device (indicated as point A in FIG. 1E), the historical path of travel of the cellular device, a direction of travel of the cellular device, a location of the other cellular device (indicated as point B in FIG. 1E), and/or a direction of travel of the other cellular device. In this example, the safety platform may determine whether the location of the other cellular device is a location that is included in the historical path of travel of the cellular device. In some implementations, the safety platform may determine that the other cellular device is traveling on a path toward the cellular device based on determining that the location of the other cellular device matches a historical location of the cellular device, based on drawing a polyline between point A and point B and determining that the location of the other cellular device intersects the polyline, and/or the like.

As further shown in FIG. 1E, example 2 illustrates an example of where the safety platform may determine whether the other cellular device is traveling on a path toward the cellular device based on determining whether the historical path of travel between point B and point A includes a self-loop (e.g., a change in direction of travel of the cellular device in which the cellular device traveled in a loop to travel in an opposite direction of a historical direction of travel along the historical path of travel). In some implementations, the safety platform may identify a self-loop by generating another polyline based on a plurality of historical locations of the cellular device (e.g., 20 locations, 25 locations, and/or the like) and determining whether the polyline intersects the other polyline. For example, the safety platform may identify a self-loop if the polyline intersects the other polyline, in which case, the safety platform may determine that the other cellular device is not traveling on a path toward the cellular device (e.g., if the cellular device and the other cellular device are traveling on opposite sides of a two (or more) lane road). In some implementations, a self-loop may be identified by checking if the snapped point lies in the polyline formed by the historical points of the same device.

In some implementations, an OSRM may check if there exists a route between A and B. The safety platform may provide the direction of travel as a parameter while computing the route to ensure direction is also taken into account. The route check takes into consideration that the route does not have "U-turn" as a maneuver. This implies that B is behind A. The safety platform may update the calculated positions in the database so that these do not have to be done on every request.

As further shown in FIG. 1E, example 3 illustrates an example where the safety platform may determine whether the other cellular device is traveling on a path toward the cellular device based on determining that the location of the other cellular device is not included in a historical path of travel of the cellular device. This may occur where, for example, the cellular device enters a road or road segment, on which the other cellular device is traveling, from a different road or road segment (e.g., at an intersection, on ramp, off ramp, roundabout, and/or the like). In this example, the safety platform may determine, using road segment information stored in the road segment store, whether a travel route exists between point B and point A.

In some implementations, the safety platform may determine whether a travel route exists between point B and point A or may provide a query to a routing engine (e.g., an open source routing machine (OSRM) and/or the like) to determine whether a travel route exists between point B and point A. The safety platform and/or the routing engine may determine whether a travel route exists between point B and point A based on the respective locations of the cellular device and the other cellular device, the respective directions of travel of the cellular device and the other cellular device, and/or the like.

Figure 1F:
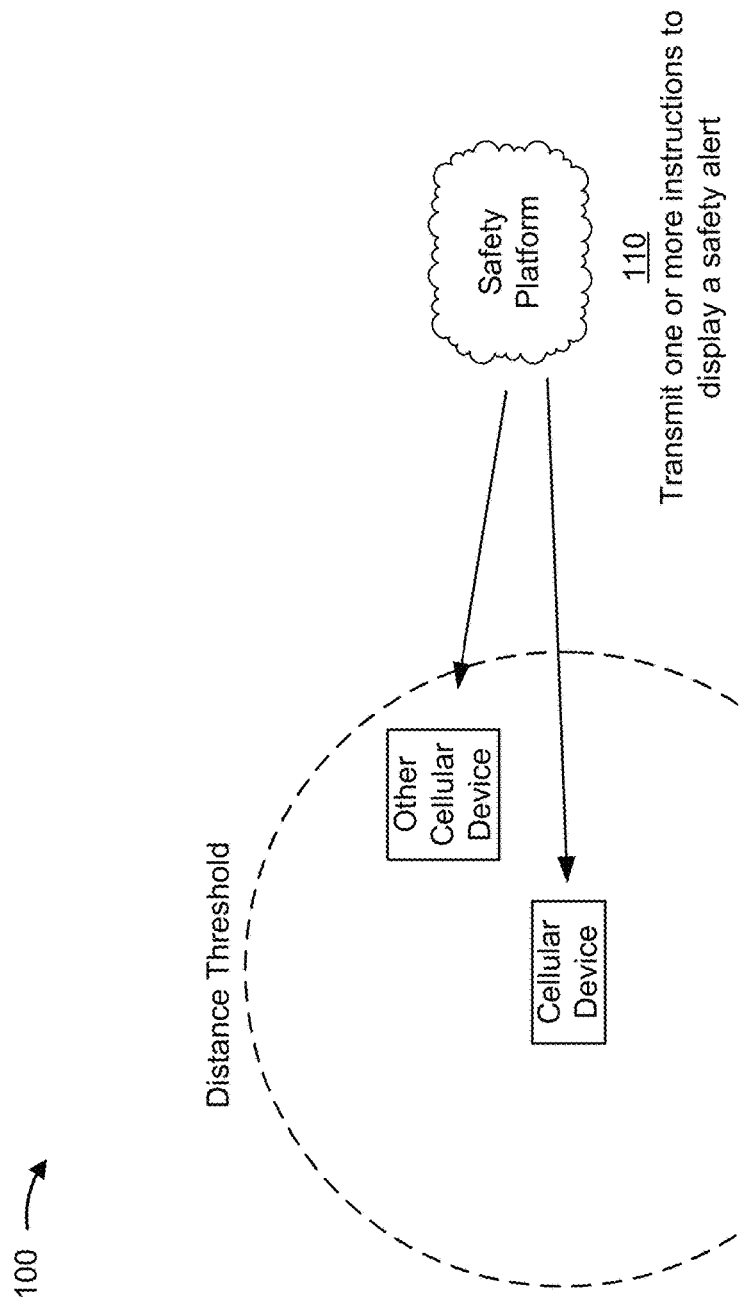

As shown in FIG. 1F, and by reference number 110, the safety platform may transmit one or more instructions to display a safety alert. For example, the safety platform may identify a potential dangerous scenario associated with the cellular device and/or the other cellular device, and may transmit, to the cellular device and/or the client device and based on identifying the potential dangerous scenario, an instruction to display a safety alert.

As an example, the safety platform may determine that the cellular device is associated with a pedestrian or cyclist transportation mode and that the other cellular device is associated with a vehicle transportation mode, and may identify a potential dangerous scenario based on determining that the other cellular device is traveling on a path toward the cellular device and at a speed, acceleration, and/or the like, that satisfies one or more thresholds, as described above. In this case, since the above-described traveling behavior of the vehicle associated with the other cellular device may cause a potential dangerous scenario for the user of the cellular device (e.g., which may be a pedestrian, a cyclist, and/or the like), the safety platform may transmit, to the cellular device, an instruction to display a safety alert to alert the user to a potential dangerous scenario associated with the vehicle of the other cellular device. Moreover, the safety platform may transmit, to the other cellular device, an instruction to display a safety alert to alert a user of the other cellular device that the vehicle associated with the other cellular device may cause a potential dangerous scenario to the user of the cellular device.

In some implementations, a safety alert may include a visual indicator, displayed in a GUI of an application and/or web portal associated with the safety service provided by the safety platform, displayed on a home screen of a cellular device, displayed on a lock screen of a cellular device, and/or the like. In some implementations, a safety alert may include one or more audible alerts played by a speaker of a cellular device. In some implementations, a safety alert may include haptic feedback provided by a cellular device.

As an example, a safety alert for a cellular device, associated with a vehicle that is causing a potential dangerous scenario, may include a visual indicator that the vehicle is traveling toward and/or approaching a cyclist, pedestrian, another vehicle, and/or the like (e.g., which may be an indication of the transportation mode associated with the cyclist, pedestrian, other vehicle, and/or the like), may include a visual indicator of the direction from which the vehicle is approaching the cyclist, pedestrian, other vehicle, and/or the like, may include a visual indicator of a distance between the vehicle and the cyclist, pedestrian, other vehicle, and/or the like, may include a visual indicator of a type of unsafe behavior that the vehicle is exhibiting (e.g., speeding, quickly accelerating, serving, and/or the like), and/or the like. In some implementations, the cellular device may display updated safety alerts as the vehicle associated with the cellular device approaches the cyclist, pedestrian, other vehicle, and/or the like. In some implementations, the cellular device may increase the frequency at which updated safety alerts are displayed, the closer that the vehicle associated with the cellular device approaches the cyclist, pedestrian, other vehicle, and/or the like.

As another example, a safety alert for a cellular device associated with a cyclist, a pedestrian, a vehicle, and/or the like, for which another vehicle is causing a potential dangerous scenario, may include a visual indicator that the other vehicle is causing the potential dangerous scenario (e.g., which may be an indication of the transportation mode associated with the other vehicle), may include a visual indicator of the direction from which the other vehicle is approaching the cyclist, pedestrian, vehicle, and/or the like, may include a visual indicator of a distance between the other vehicle and the cyclist, pedestrian, vehicle, and/or the like, may include a visual indicator of a type of unsafe behavior that the other vehicle is exhibiting (e.g., speeding, quickly accelerating, serving, and/or the like), and/or the like. In some implementations, the cellular device may display updated safety alerts as the other vehicle approaches the cyclist, pedestrian, vehicle, and/or the like associated with the cellular device. In some implementations, the cellular device may increase the frequency at which updated safety alerts are displayed, the closer that the other vehicle approaches the cyclist, pedestrian, vehicle, and/or the like associated with the cellular device.

In some implementations, if the vehicle associated with a cellular device is an autonomous vehicle, semi-autonomous vehicle, and/or the like, the safety platform may transmit an instruction to the cellular device to automatically control the vehicle based on the vehicle causing a potential dangerous scenario for another vehicle, for a cyclist, for a pedestrian, and/or the like. For example, the instruction may cause the cellular device to automatically reduce a traveling speed of the vehicle, to modify a direction of travel of the vehicle, and/or the like. For example, another vehicle, a cyclist, a pedestrian, and/or the like, may be stopped and/or pulled over to a side of a road on which the vehicle is traveling, may be stopped on the road, may be at least partially on a side the road and partially on the road, and/or the like. In this case, the safety platform may transmit, to the cellular device, an instruction for the cellular device to automatically reduce a speed of travel of the vehicle and to navigate the vehicle around the other vehicle, cyclist, pedestrian, and/or the like. In some implementations, the safety platform may transmit an instruction to cause the cellular device to automatically control the vehicle in one or more roadside alert (RSA) messages and/or other types of communications. Additionally and/or alternatively, the cellular device may send alerts to the vehicle based on the dangerous scenario so that the vehicle's control system can decide on what action to take based on the alerts provided by cellular device.

In some implementations, the safety platform may perform the techniques described above in connection with reference numbers 102-110 for a plurality of cellular devices (e.g., sequentially, in parallel, and/or the like). In this way, a cellular device may provide travel information to the safety platform, and the safety platform may detect potential dangerous scenarios associated with the cellular device based on the travel information associated with the cellular device as well as travel information associated with other cellular devices. Moreover, the safety platform may transmit safety alerts associated with the potential dangerous scenarios to the cellular device via a cellular network and/or other types of wireless networks. Accordingly, the safety platform is capable of detecting potential dangerous scenarios that may otherwise not be detectable based on proximity detection and/or line-of-sight vision, which increases the potential dangerous scenario detection capability of the safety platform. Moreover, detecting potential dangerous scenarios based on travel information associated with a cellular device permits the safety platform to provide safety alerts to cellular devices that may not be equipped with components and/or functionality to detect potential dangerous scenarios based on proximity detection and/or line-of-sight vision. In this way, the safety platform may be permitted to provide safety alerts to pedestrians, cyclists, and/or users traveling by other types of transportation modes, which creates the ability to provide safety alerts for many different types of transportation modes.

As indicated above, FIGS. 1A-1F are provided as one or more examples. Other examples may differ from what is described with regard to FIGS. 1A-1F.

FIGS. 2A-2D are diagrams of example views 200 of a GUI that may be used in some implementations described herein. In some implementations, a cellular device, such as one or more of the cellular devices described above in connection with FIGS. 1A-1F, may be configured with an application and/or configured to access a web portal to use a safety service provided by the safety platform described above in connection with FIGS. 1A-1F. In some implementations, the example views may be example views of the GUI of the application, the web portal, and/or the like.

Figure 2A:
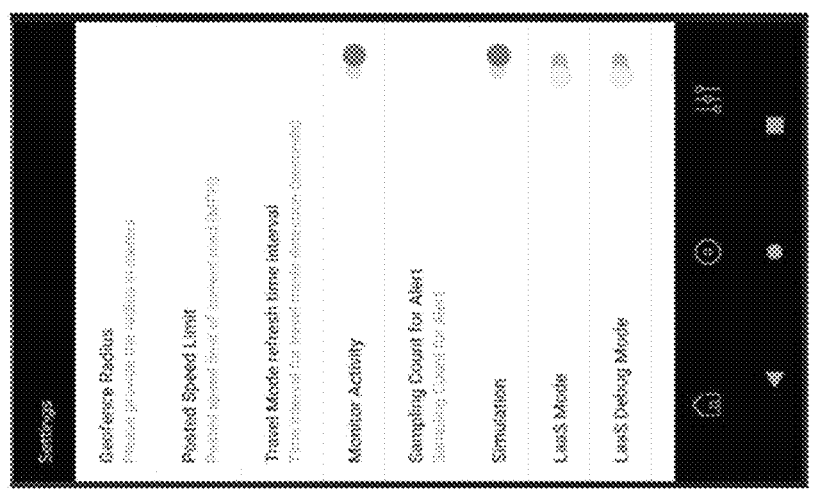
FIGS. 2A-2D are diagrams of example views of a graphical user interface.

As shown in FIG. 2A, an example view of the GUI may include a settings menu, by which a user may provide input to set, adjust, and/or modify one or more parameters of the application, the web portal, and/or the safety service. For example, a geofencing parameter may permit the user to adjust the distance threshold within which the safety platform identifies other cellular devices, vehicles, and/or other traveling entities near the cellular device. As another example, a travel mode refresh time interval parameter may permit the user to adjust a time interval at which the cellular device and/or the safety platform updates the transportation mode of the cellular device. As another example, a location as a service (LaaS) parameter may permit the user to enable or disable RTK services on the cellular device and/or the safety platform for determining RTK corrected GNSS locations of the cellular device.

Figure 2B:
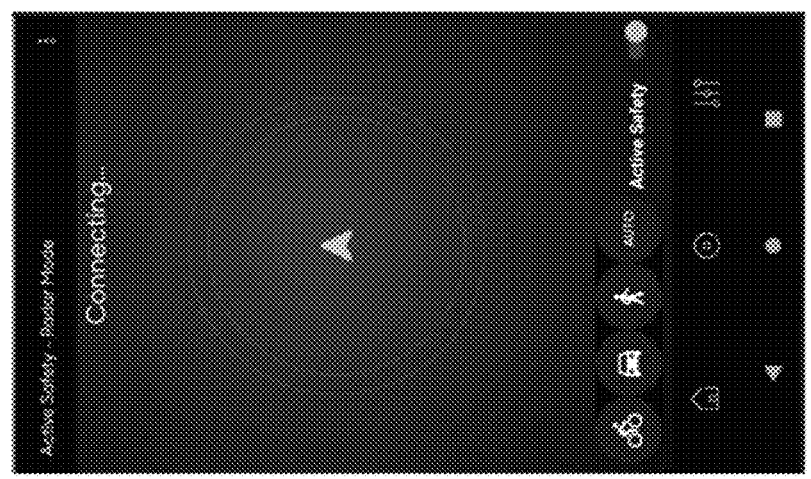

As shown in FIG. 2B, an example view of the GUI may include a monitoring interface of the safety service. The monitoring interface may permit the user to enable and/or disable the safety service, may permit the user to select the transportation mode of the cellular device, may permit the user to select an auto mode for the cellular device and/or safety platform to automatically determine the transportation mode of the cellular device, and/or the like.

Figure 2C:
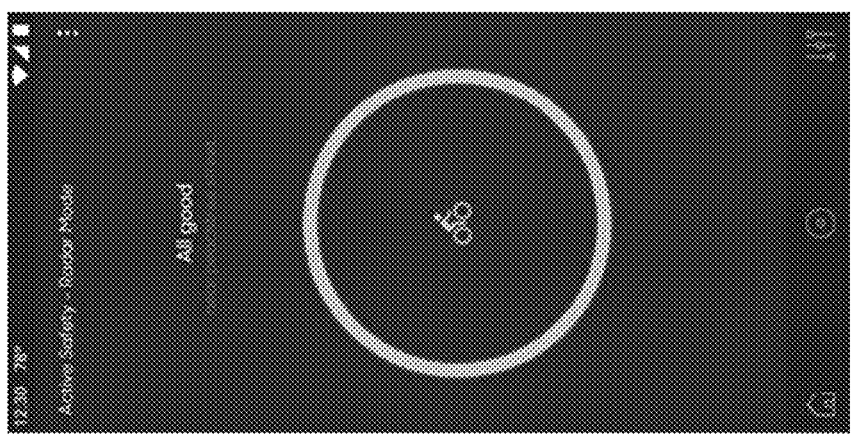

As shown in FIG. 2C, an example of the GUI may include another view of the monitoring interface of the safety service. In this view, the safety service has been enabled, and no safety alerts have been displayed. Moreover, in this view, the GUI may include a display of a visual indication that no potential dangerous scenarios are present.

Figure 2D:
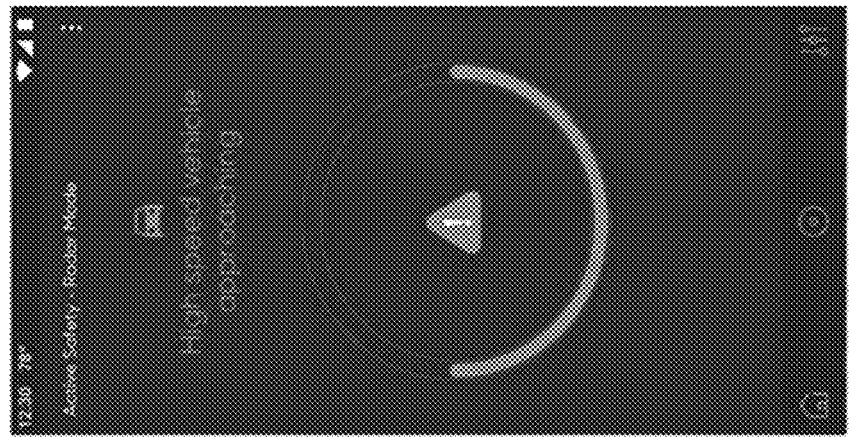
Figure 2D:
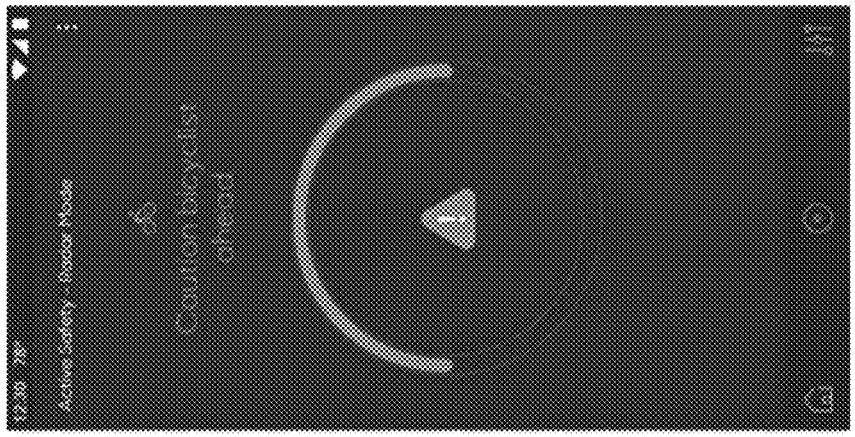

FIG. 2D illustrates a plurality of example safety alerts that may be displayed via the GUI. Example alert 1 may include a safety alert that is displayed on a cellular device associated with a cyclist, pedestrian, vehicle, and/or the like, as a result of another vehicle causing a potential dangerous scenario for the cyclist, pedestrian, vehicle, and/or the like. As shown in FIG. 2D, example alert 1 may include a visual indication of the transportation mode of the other vehicle, a visual indication of the type of potential dangerous scenario (e.g., the other vehicle is traveling at high speed), a visual indication of a direction from which the other vehicle is approaching the cyclist, pedestrian, vehicle, and/or the like (e.g., a bottom half of a circle is illuminated to indicate that the other vehicle is approaching from behind the cyclist, pedestrian, vehicle, and/or the like), and/or the like. Moreover, the visual indication of the direction from which the other vehicle is approaching the cyclist, pedestrian, vehicle, and/or the like may function as a visual indication of a distance between the other vehicle and the cyclist, pedestrian, vehicle, and/or the like. For example, the bottom half of the circle that is illuminated may shrink in size as the vehicle approaches the cyclist, pedestrian, vehicle, and/or the like.

As another example, haptic feedback, such as a vibration, may be provided at an increasing frequency as the distance between the other vehicle and the cyclist, pedestrian, vehicle, and/or the like decreases.

Example alert 2 may include a safety alert that is displayed on a cellular device associated with a vehicle that is causing a potential dangerous scenario for a cyclist. As shown in FIG. 2D, example alert 2 may include a visual indication of the transportation mode of the cyclist, a visual indication of a direction at which the vehicle is approaching the cyclist (e.g., a top half of a circle is illuminated to indicate that the vehicle is traveling toward the cyclist), and/or the like. Moreover, the visual indication of the direction at which the vehicle is approaching the cyclist may function as a visual indication of a distance between the vehicle and the cyclist. For example, the top half of the circle that is illuminated may shrink in size as the vehicle approaches the cyclist. As another example, haptic feedback, such as a vibration, may be provided at an increasing frequency as the vehicle approaches the cyclist.

As indicated above, FIGS. 2A-2D are provided as one or more examples. Other examples may differ from what is described with regard to FIGS. 2A-2D.

Figure 3:
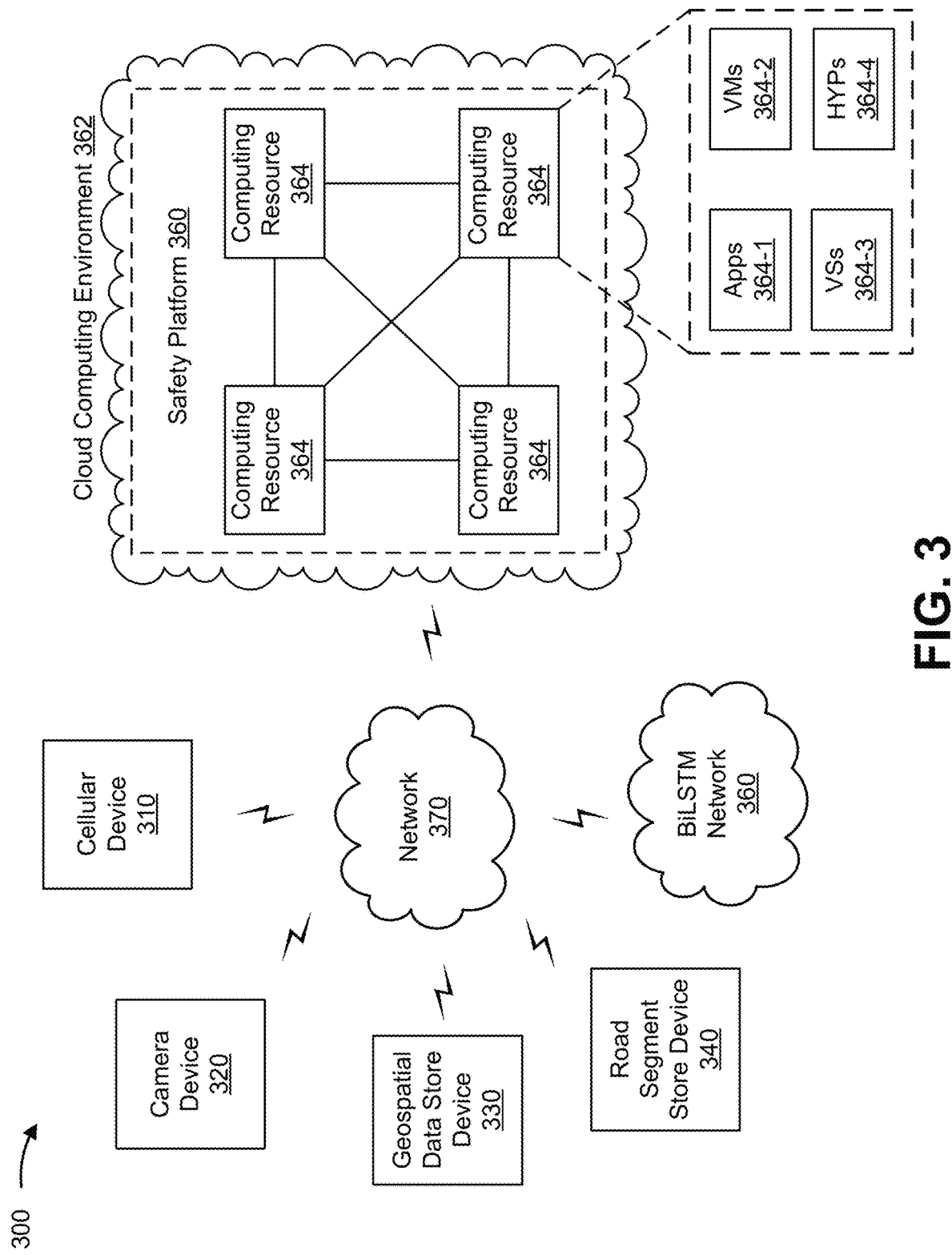
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more cellular devices 310, one or more camera devices 320, a geospatial data store device 330, a road segment store 340, a BiLSTM network 350, a safety platform 360 implemented in a cloud computing environment 362, a computing resource 364, and a network 370. Devices of environment 300 may interconnect via wired connections, wireless connections, or a combination of wired and wireless connections. Additionally and/or alternatively to environment 300 including BiLSTM network 350, safety platform 360 may perform the functionalities described in connection with the BiLSTM network 350.

Cellular device 310 includes one or more devices capable of receiving, generating, storing, processing, and/or providing information associated with cellular network delivery of travel safety alerts.

In some implementations, cellular device 310 may include a device integrated into a vehicle, such as an in-dash infotainment unit, an integrated GPS device or another type of integrated navigation device, an on-board diagnostics (OBD) device, an electronic control unit (ECU), and/or the like. In some implementations, cellular device 310 may include a device that is separate from a vehicle, such as a mobile phone (e.g., a smart phone, and/or the like), a laptop computer, a tablet computer, a wearable communication device (e.g., a smart wristwatch, a pair of smart eyeglasses, and/or the like), a standalone GPS device or another type of standalone navigation device, or a similar type of device.

Camera device 320 includes one or more devices capable of receiving, generating, storing, processing, and/or providing information associated with cellular network delivery of travel safety alerts. For example, camera device 320 may include a device capable of recording and/or streaming video, images, metadata, and/or the like to safety platform 360, geospatial data store device 330, and/or other devices included in environment 300. In some implementations, camera device 320 may include a smart camera, an Internet protocol (IP) camera, a closed-circuit television (CCTV) camera, and/or another type of camera. In some implementations, camera device 320 may be deployed to record and/or stream video of a road segment, a city segment, and/or another area where pedestrians, cyclists, vehicles, and/or the like typically travel.

Geospatial data store device 330 includes one or more devices capable of receiving, generating, storing, processing, and/or providing information associated with cellular network delivery of travel safety alerts. For example, geospatial data store device 330 may include a device that implements a geospatial data store capable of storing travel information associated with cellular device 310, recorded or live streamed video from camera device 320, and/or other types of geospatial information. In some implementations, geospatial data store device 330 may include a memory device, a storage device, a computing device, a cloud-based data store (e.g., that may be included as a part of safety platform 360 and/or another cloud-based platform), and/or another type of device that is configured to store information.

Road segment store device 340 includes one or more devices capable of receiving, generating, storing, processing, and/or providing information associated with cellular network delivery of travel safety alerts. For example, road segment store device 340 may include a device that implements a road segment store capable of storing information identifying road segments for one or more geographic areas, such as a city, a county, a state, a country, and/or the like. In some implementations, road segment device 340 may be localized to the geographic area served by the safety platform 360 and/or other geographic areas. In some implementations, road segment store device 340 may include a memory device, a storage device, a computing device, a cloud-based data store (e.g., that may be included as a part of safety platform 360 and/or another cloud-based platform), and/or another type of device that is configured to store information.

BiLSTM network 350 includes one or more devices capable of receiving, generating, storing, processing, and/or providing information associated with cellular network delivery of travel safety alerts. For example, BiLSTM network 350 may include a device capable of implementing a BiLSTM network with other BiLSTM network 350. Moreover, BiLSTM network 350 may be capable of training and/or using a machine learning model (e.g., a BiLSTM model and/or another type of machine learning model) to determine a transportation mode of cellular device 310 and/or other devices. In some implementations, cellular device 310 may include a server device, a desktop computer, a mobile device (e.g., a smart phone, and/or the like), a laptop computer, a tablet computer, a wearable communication device, or a similar type of device. In some implementations, BiLSTM network 350 may be implemented by safety platform 360 and/or another cloud-based platform.

Safety platform 360 includes one or more computing resources 364 capable of receiving, generating, storing, processing, and/or providing information associated with cellular network delivery of travel safety alerts. For example, safety platform 360 may be a platform implemented by cloud computing environment 362 or a mobile edge compute (MEC) device, and may be capable of detecting potential dangerous scenarios associated with cellular device 310, may be capable of providing safety alerts, associated with the potential dangerous scenarios, to cellular device 310 via network 370, and/or the like. In some implementations, safety platform 360 may receive travel information associated with cellular device 310 (e.g., via network 370), may identify, based on the travel information, one or more other cellular devices 310 that are located within a distance threshold from the cellular device 310, may determine that one of the other cellular devices 310 is traveling on a path toward the cellular device 310 and at a speed that satisfies a speed threshold, may transmit (e.g., via network 370), based on determining that the other cellular device 310 is traveling on the path toward the cellular device 310 and at the speed that satisfies the speed threshold, an instruction to the cellular device 310 for the cellular device 310 to display a safety alert, and/or the like.

Safety platform 360 may include a server device or a group of server devices. In some implementations, safety platform 360 may be hosted in cloud computing environment 362. Notably, while implementations described herein describe safety platform 360 as being hosted in cloud computing environment 362, in some implementations, safety platform 360 may not be cloud-based or may be partially cloud-based.

Cloud computing environment 362 includes an environment that delivers computing as a service, whereby shared resources, services, etc. may be provided to safety platform 360. Cloud computing environment 362 may provide computation, software, data access, storage, and/or other services that do not require end-user knowledge of a physical location and configuration of a system and/or a device that delivers the services. As shown, cloud computing environment 362 may include safety platform 360 and computing resource 364.

Computing resource 364 includes one or more personal computers, workstation computers, server devices, or another type of computation and/or communication device. In some implementations, computing resource 364 may host safety platform 360. The cloud resources may include compute instances executing in computing resource 364, storage devices provided in computing resource 364, data transfer devices provided by computing resource 364, etc. In some implementations, computing resource 364 may communicate with other computing resources 364 via wired connections, wireless connections, or a combination of wired and wireless connections.

As further shown in FIG. 3, computing resource 364 may include a group of cloud resources, such as one or more applications ("APPs") 364-1, one or more virtual machines ("VMs") 364-2, virtualized storage ("VSs") 364-3, one or more hypervisors ("HYPs") 364-4, or the like.

Application 364-1 includes one or more software applications that may be provided to or accessed by cellular device 310. Application 364-1 may eliminate a need to install and execute the software applications on cellular device 310. For example, application 364-1 may include software associated with safety platform 360 and/or any other software capable of being provided via cloud computing environment 362. In some implementations, one application 364-1 may send/receive information to/from one or more other applications 364-1, via virtual machine 364-2.

Virtual machine 364-2 includes a software implementation of a machine (e.g., a computer) that executes programs like a physical machine. Virtual machine 364-2 may be either a system virtual machine or a process virtual machine, depending upon use and degree of correspondence to any real machine by virtual machine 364-2. A system virtual machine may provide a complete system platform that supports execution of a complete operating system ("OS"). A process virtual machine may execute a single program, and may support a single process. In some implementations, virtual machine 364-2 may execute on behalf of a user (e.g., of cellular device 310), and may manage infrastructure of cloud computing environment 362, such as data management, synchronization, or long-duration data transfers.

Virtualized storage 364-3 includes one or more storage systems and/or one or more devices that use virtualization techniques within the storage systems or devices of computing resource 364. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 364-4 provides hardware virtualization techniques that allow multiple operating systems (e.g., "guest operating systems") to execute concurrently on a host computer, such as computing resource 364. Hypervisor 364-4 may present a virtual operating platform to the guest operating systems, and may manage the execution of the guest operating systems. Multiple instances of a variety of operating systems may share virtualized hardware resources.

Network 370 includes one or more wired and/or wireless networks. For example, network 370 may include a cellular network (e.g., a 5G/NR network, an LTE network, a code division multiple access (CDMA) network, a 3G network, a 4G network, a 5G network, and/or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a BiLSTM network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
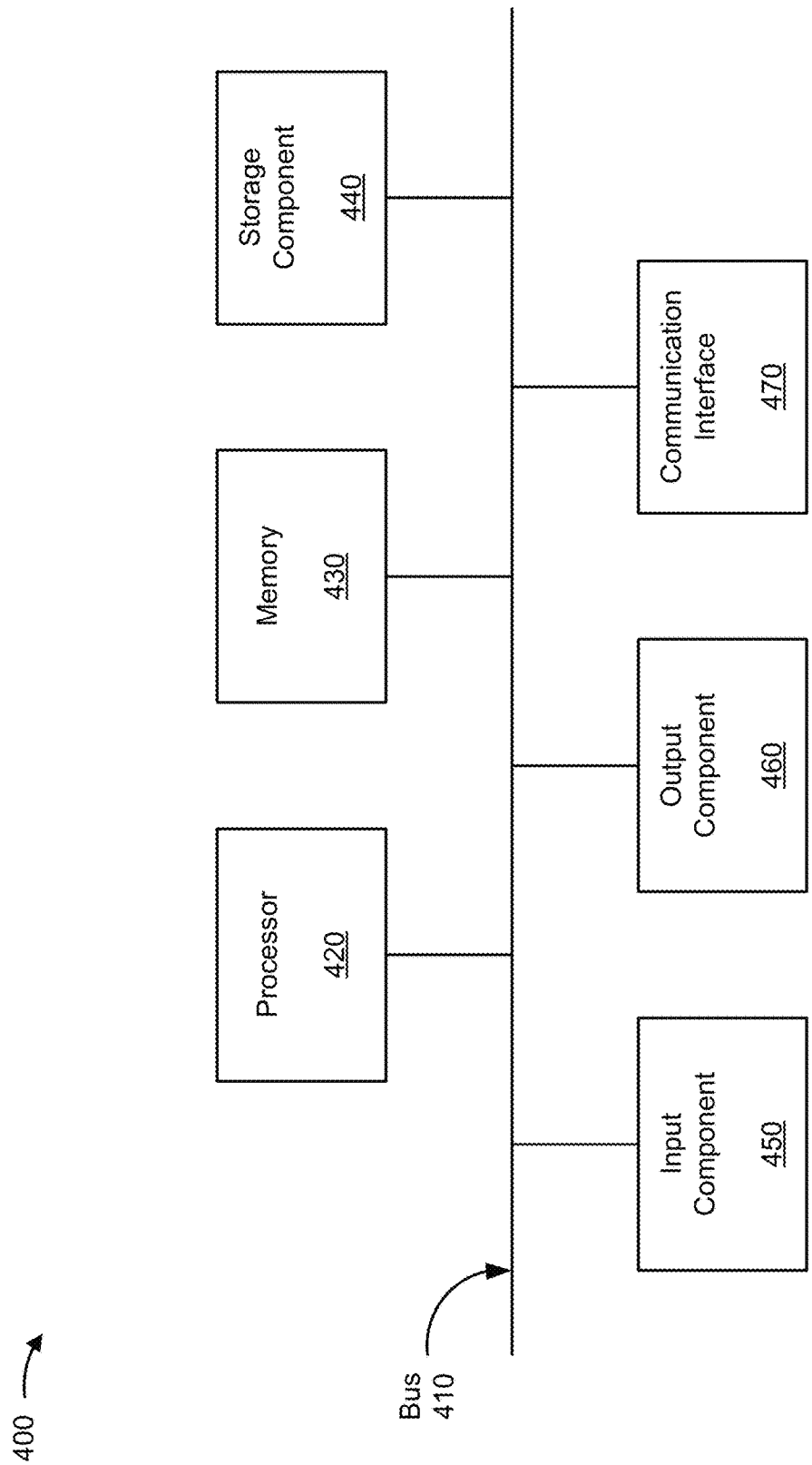
FIG. 4 is a diagram of example components of one or more devices of FIG. 3.

FIG. 4 is a diagram of example components of a device 400. Device 400 may correspond to cellular device 310, camera device 320, geospatial data store device 330, road segment store 340, BiLSTM network 350, safety platform 360, computing resource 364, and/or one or more devices included in network 370. In some implementations, cellular device 310, camera device 320, geospatial data store device 330, road segment store 340, BiLSTM network 350, safety platform 360, computing resource 364, and/or one or more devices included in network 370 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RANI), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for cellular delivery of travel safety alerts. In some implementations, one or more process blocks of FIG. 5 may be performed by a safety platform (e.g., safety platform 360). In some implementations, one or more process blocks of FIG. 5 may be performed by another device or a group of devices separate from or including the safety platform, such as a cellular device (e.g., cellular device 310), a camera device (e.g., camera device 320), a geospatial data store device (e.g., geospatial data store device 330), a road segment store device (e.g., road segment store device 340), a BiLSTM network (e.g., BiLSTM network 350), an MEC device, and/or the like.

As shown in FIG. 5, process 500 may include receiving travel information associated with a first cellular device, wherein the travel information associated with the first cellular device identifies at least one of a location of the first cellular device, a direction of travel of the first cellular device, or a navigation route associated with the first cellular device (block 510). For example, the safety platform (e.g., using computing resource 364, processor 420, memory 430, storage component 440, input component 450, output component 460, communication interface 470, and/or the like) may receive travel information associated with a first cellular device, as described above. In some implementations, the travel information associated with the first cellular device identifies at least one of a location of the first cellular device, a direction of travel of the first cellular device, or a navigation route associated with the first cellular device.

As further shown in FIG. 5, process 500 may include identifying, based on the travel information associated with the first cellular device, one or more other cellular devices that are located within a distance threshold from the first cellular device, wherein the distance threshold is based on at least the travel information associated with the first cellular device and a transportation mode of the first cellular device (block 520). For example, the safety platform (e.g., using computing resource 364, processor 420, memory 430, storage component 440, input component 450, output component 460, communication interface 470, and/or the like) may identify, based on the travel information associated with the first cellular device, one or more other cellular devices that are located within a distance threshold from the first cellular device, as described above. In some implementations, the distance threshold is based on at least the travel information associated with the first cellular device and a transportation mode of the first cellular device.

As further shown in FIG. 5, process 500 may include determining that a second cellular device, of the one or more other cellular devices, is traveling on a path toward the first cellular device and at a speed that satisfies a speed threshold (block 530). For example, the safety platform (e.g., using computing resource 364, processor 420, memory 430, storage component 440, input component 450, output component 460, communication interface 470, and/or the like) may determine that a second cellular device, of the one or more other cellular devices, is traveling on a path toward the first cellular device and at a speed that satisfies a speed threshold, as described above.

As further shown in FIG. 5, process 500 may include transmitting, based on determining that the second cellular device is traveling on the path toward the first cellular device and at the speed that satisfies the speed threshold, an instruction to the first cellular device to display a safety alert (block 540). For example, the safety platform (e.g., using computing resource 364, processor 420, memory 430, storage component 440, input component 450, output component 460, communication interface 470, and/or the like) may transmit, based on determining that the second cellular device is traveling on the path toward the first cellular device and at the speed that satisfies the speed threshold, an instruction to the first cellular device to display a safety alert, as described above.

Process 500 may include additional implementations, such as any single implementation or any combination of implementations described below and/or in connection with one or more other processes described elsewhere herein.

In a first implementation, identifying the one or more other cellular devices that are located within a distance threshold from the first cellular device includes identifying the second cellular device, that is located within the distance threshold from the first cellular device, based on the travel information associated with the first cellular device and travel information associated with the second cellular device.

In a second implementation, alone or in combination with the first implementation, process 500 further includes transmitting, to the second cellular device and based on determining that the second cellular device is traveling on the path toward the first cellular device and at the speed that satisfies the speed threshold, at least one of an instruction to display another safety alert, an instruction (e.g., a roadside alert and/or another type of instruction) to reduce a traveling speed of an autonomous vehicle associated with the second cellular device, an instruction to modify a direction of travel of the autonomous vehicle and/or to navigate around the second cellular device, or an instruction to display a safety alert, based on receiving an indication of an emergency alert associated with the first cellular device, that indicates the second cellular device is approaching the first cellular device while a vehicle associated with the first cellular device is pulled over alongside a road.

In a third implementation, alone or in combination with one or more of the first and second implementations, determining that a second cellular device, of the one or more other cellular devices, is traveling on a path toward the first cellular device and at a speed that satisfies a speed threshold includes determining that the second cellular device is traveling on the path toward the first cellular device, and at the speed that satisfies the speed threshold, based on at least one of the location of the first cellular device identified in the travel information associated with the first cellular device, the location of the second cellular device identified in the travel information associated with the second cellular device, the direction of travel of the first cellular device identified in the travel information associated with the first cellular device, the direction of travel of the second cellular device identified in the travel information associated with the second cellular device, or the speed of travel of the second cellular device.

In a fourth implementation, alone or in combination with the first through third implementations, the location of the first cellular device includes a GNSS estimated location of the first cellular device or an RTK corrected GNSS location of the first cellular device and, if the location of the first cellular device comprises the GNSS estimated location of the first cellular device, process 500 further includes determining, based on the GNSS estimated location, the RTK corrected GNSS location of the first cellular device, and the location of the second cellular device includes an RTK corrected location of the second cellular device.

In a fifth implementation, alone or in combination with one or more of the first through fourth implementations, identifying the one or more other cellular devices that are located within the distance threshold from the first cellular device includes determining that the one or more other cellular devices are traveling on the same road segment, within the distance threshold, as the first cellular device, and identifying the one or more other cellular devices based on determining that the one or more other cellular devices are traveling on the same road segment, within the distance threshold, as the first cellular device.

In a sixth implementation, alone or in combination with one or more of the first through fifth implementations, identifying the one or more other cellular devices that are located within the distance threshold from the first cellular device includes determining that the one or more other cellular devices are traveling on a road segment that intersects, within the distance threshold, with a road segment on which the first cellular device is traveling, and identifying the one or more other cellular devices based on determining that the one or more other cellular devices are traveling on the road segment that intersects, within the distance threshold, with the road segment on which the first cellular device is traveling.

In a seventh implementation, alone or in combination with one or more of the first through sixth implementations, process 500 further includes determining, using a machine learning model, the transportation mode of the first cellular device based on information identifying a plurality of historical locations of the first cellular device, historical speed of travel of the first cellular device, and historical acceleration of the first cellular device.

In an eighth implementation, alone or in combination with one or more of the first through seventh implementations, the transportation mode of the first cellular device includes a pedestrian transportation mode, a cycling transportation mode, or a vehicle transportation mode.

In a ninth implementation, alone or in combination with one or more of the first through eighth implementations, determining that the second cellular device is traveling on the path toward the first cellular device comprises at least one of determining that a location of the second cellular device is included in a historical path traveled by the first cellular device and/or a location of the second cellular device, or identifying, based on determining that the location of the second cellular device is not included in the historical path traveled by the first cellular device, a route between the location of the first cellular device and the location of the second cellular device.

In a tenth implementation, alone or in combination with one or more of the first through ninth implementations, receiving the travel information associated with the first cellular device includes receiving the travel information associated with the first cellular device from the first cellular device and storing the travel information associated with the first cellular device in a geospatial data store, and process 500 further includes receiving duplicate travel information associated with the first cellular device from one or more smart cameras, storing the duplicate travel information in the geospatial data store, and deduplicating the travel information associated with the first cellular device and the duplicate travel information in the geospatial data store.

In an eleventh implementation, alone or in combination with one or more of the first through tenth implementations, deduplicating the travel information associated with the first cellular device and the duplicate travel information includes determining that a distance between the location of the first cellular device identified in the travel information associated with the first cellular device and another location of the first cellular device identified in the duplicate travel information satisfies a distance threshold, wherein the other location is provided by a camera device, determining that a difference between a time at which the travel information associated with the first cellular device was obtained and a time at which the duplicate travel information was obtained satisfies a timing threshold, identifying, based on determining that the distance between the location of the first cellular device and the other location of the first cellular device satisfies the distance threshold and that the difference between the time at which the travel information associated with the first cellular device was obtained and the time at which the duplicate travel information was obtained satisfies the timing threshold, the travel information associated with the first cellular device in the geospatial data store using a KNN machine learning algorithm, determining, based on identifying the travel information associated with the first cellular device, that a transportation mode of the first cellular device identified in the travel information associated with the first cellular device and a transportation mode of the first cellular device identified in the duplicate travel information are a same transportation mode, and removing, based on determining that the transportation mode of the first cellular device identified in the travel information associated with the first cellular device and the transportation mode of the first cellular device identified in the duplicate travel information are the same transportation mode, the duplicate travel information from the geospatial data store.

In a twelfth implementation, alone or in combination with one or more of the first through eleventh implementations, the distance threshold is based on at least one of the vehicle transportation mode associated with the first cellular device, the location of the first cellular device, the direction of travel of the first cellular device, or the speed of travel of the first cellular device.

In a thirteenth implementation, alone or in combination with one or more of the first through twelfth implementations, process 500 further comprises determining to transmit the instruction to the first cellular device to display the safety alert associated with the second cellular device, and to transmit the instruction to the second cellular device to display the safety alert associated with the first cellular device, based on a transportation mode of the first cellular device being a cycling transportation mode or a pedestrian transportation mode, and a transportation mode of the second cellular device being a vehicle transportation mode.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, travel information associated with a first cellular device,
      wherein the travel information associated with the first cellular device identifies at least one of:
      a location of the first cellular device,
      a direction of travel of the first cellular device, or
      a navigation route associated with the first cellular device;
   determining, by the device, duplicate travel information of the travel information associated with the first cellular device, based on:
      a distance between a first location identified in a first travel information, of the travel information associated with the first cellular device, and a second location identified in a second travel information, of the travel information associated with the first cellular device, being within a first threshold distance,
         wherein the first travel information is obtained from the first cellular device and the second travel information is obtained from another device; and
      comparing a first transportation mode identified in the first travel information and a second transportation mode identified in the second travel information;
   removing, by the device, the duplicate travel information from the travel information associated with the first cellular device;
   identifying, by the device and based on the travel information associated with the first cellular device, one or more other cellular devices that are located within a second threshold distance from the first cellular device,
      wherein the second threshold distance is based on at least:
         the travel information associated with the first cellular device, and
         a transportation mode of the first cellular device;
   determining, by the device, that a second cellular device, of the one or more other cellular devices, is traveling on a path toward the first cellular device and at a speed that satisfies a speed threshold; and
   transmitting, by the device and based on determining that the second cellular device is traveling on the path toward the first cellular device and at the speed that satisfies the speed threshold, an instruction to the first cellular device to display a safety alert.

2. The method of claim 1, further comprising:
transmitting, to the second cellular device and based on determining that the second cellular device is traveling on the path toward the first cellular device and at the speed that satisfies the speed threshold, at least one of:
an instruction to display another safety alert,
an instruction to reduce a traveling speed of an autonomous vehicle associated with the second cellular device, or
an instruction to modify a direction of travel of the autonomous vehicle.

3. The method of claim 1, wherein the location of the first cellular device comprises:
a global navigation satellite system (GNSS) estimated location of the first cellular device, or
a real-time kinematics (RTK) corrected GNSS location of the first cellular device; and
wherein, if the location of the first cellular device comprises the GNSS estimated location of the first cellular device, the method further comprises:
determining, based on the GNSS estimated location, the RTK corrected GNSS location of the first cellular device.

4. The method of claim 1, wherein identifying the one or more other cellular devices that are located within the second threshold distance from the first cellular device comprises:
determining that the one or more other cellular devices are traveling on a same road segment, within the second threshold distance, as the first cellular device; and
identifying the one or more other cellular devices based on determining that the one or more other cellular devices are traveling on the same road segment, within the second threshold distance, as the first cellular device.

5. The method of claim 1, wherein identifying the one or more other cellular devices that are located within the second threshold distance from the first cellular device comprises:
determining that the one or more other cellular devices are traveling on a first road segment that intersects, within the second threshold distance, with a second road segment on which the first cellular device is traveling; and
identifying the one or more other cellular devices based on determining that the one or more other cellular devices are traveling on the first road segment that intersects, within the second threshold distance, with the second road segment on which the first cellular device is traveling.

6. The method of claim 1, further comprising:
determining, using a machine learning model, the transportation mode of the first cellular device based on information identifying:
a plurality of historical locations of the first cellular device,
historical speed of travel of the first cellular device, and
historical acceleration of the first cellular device; and
wherein the transportation mode of the first cellular device comprises:
a pedestrian transportation mode,
a cycling transportation mode, or
a vehicle transportation mode.

7. The method of claim 1, wherein determining that the second cellular device is traveling on the path toward the first cellular device comprises at least one of:

determining that a location of the second cellular device is included in a historical path traveled by the first cellular device, or
identifying, based on determining that the location of the second cellular device is not included in the historical path traveled by the first cellular device, a route between the location of the first cellular device and the location of the second cellular device.

8. A device, comprising:
one or more memories; and
one or more processors, communicatively coupled to the one or more memories, to:
receive travel information associated with a first cellular device,
wherein the first cellular device is associated with a vehicle transportation mode, and
wherein the travel information associated with the first cellular device identifies:
a location of the first cellular device,
a direction of travel of the first cellular device, and
a speed of travel of the first cellular device;
determine duplicate travel information of the travel information associated with the first cellular device, based on:
a distance between a first location identified in a first travel information, of the travel information associated with the first cellular device, and a second location identified in a second travel information, of the travel information associated with the first cellular device, being within a first threshold distance,
wherein the first travel information is obtained from the first cellular device and the second travel information is obtained from another device; and
comparing a first transportation mode identified in the first travel information and a second transportation mode identified in the second travel information;
remove the duplicate travel information from the travel information associated with the first cellular device;
identify a second cellular device, that is located within a second threshold distance from the first cellular device, based on:
the travel information associated with the first cellular device, and
travel information associated with the second cellular device;
determine that the first cellular device is traveling on a path toward the second cellular device and that the speed of travel of the first cellular device satisfies a speed threshold; and
transmit, to the first cellular device, based on determining that the first cellular device is traveling on the path toward the second cellular device and at the speed that satisfies the speed threshold, at least one of:
an instruction to display a safety alert, based on the second cellular device being associated with a cycling transportation mode or a pedestrian transportation mode, that indicates the first cellular device is approaching the second cellular device, or
an instruction to display a safety alert, based on receiving an indication of an emergency alert associated with the second cellular device, that indicates the first cellular device is approaching the second cellular device while a vehicle associated with the second cellular device is pulled over alongside a road.

9. The device of claim 8, wherein the one or more processors are further to:
transmit, to the first cellular device, an instruction to cause an autonomous vehicle, associated with the first cellular device, to reduce a speed of travel of the autonomous vehicle and to navigate around the vehicle, associated with the second cellular device, pulled over alongside the road.

10. The device of claim 8, wherein the one or more processors, when identifying the second cellular device that is located within the second threshold distance from the first cellular device, are to:
determine that the second cellular device is traveling on a same road segment, within the second threshold distance, as the first cellular device; and
identify the second cellular device based on determining that the second cellular device is traveling on a same road segment, within the second threshold distance, as the first cellular device.

11. The device of claim 8, wherein the one or more processors, when identifying the second cellular device that is located within the second threshold distance from the first cellular device, are to:
determine that the second cellular device is traveling on a first road segment that intersects, within the second threshold distance, with a second road segment on which the first cellular device is traveling; and
identify the second cellular device based on determining that the second cellular device is traveling on the first road segment that intersects, within the second threshold distance, with the second road segment on which the first cellular device is traveling.

12. The device of claim 8, wherein the second threshold distance is based on at least one of:
the vehicle transportation mode associated with the first cellular device,
the location of the first cellular device,
the direction of travel of the first cellular device, or
the speed of travel of the first cellular device.

13. The device of claim 8, wherein the one or more processors, when determining that the first cellular device is traveling on the path toward the second cellular device, are to:
determine that the first cellular device is traveling on the path toward the second cellular device based on:
a historical path of travel of the second cellular device, and
the location of the first cellular device.

14. The device of claim 8, wherein the one or more processors, when determining that the first cellular device is traveling on the path toward the second cellular device, are to:
determine that the first cellular device is traveling on the path toward the second cellular device based on:
the location of the first cellular device,
the direction of travel of the first cellular device,
a location of the second cellular device identified in the travel information associated with the second cellular device; and
a direction of travel of the second cellular device identified in the travel information associated with the second cellular device.

15. A non-transitory computer-readable medium storing instructions, the instructions comprising:
one or more instructions that, when executed by one or more processors of a device, cause the one or more processors to:
receive travel information associated with a first cellular device;
determine duplicate travel information of the travel information associated with the first cellular device, based on:
a distance between a first location identified in a first travel information, of the travel information associated with the first cellular device, and a second location identified in a second travel information, of the travel information associated with the first cellular device, being within a first threshold distance,
wherein the first travel information is obtained from the first cellular device and the second travel information is obtained from another device; and
comparing a first transportation mode identified in the first travel information and a second transportation mode identified in the second travel information;
removing, by the device, the duplicate travel information from the travel information associated with the first cellular device;
receive travel information associated with a second cellular device;
identify, based on the travel information associated with the first cellular device and the travel information associated with the second cellular device, that the second cellular device is within a second threshold distance from the first cellular device;
determine that the second cellular device is traveling on a path toward the first cellular device, and at a speed that satisfies a speed threshold, based on at least one of:
a location of the first cellular device identified in the travel information associated with the first cellular device,
a location of the second cellular device identified in the travel information associated with the second cellular device,
a direction of travel of the first cellular device identified in the travel information associated with the first cellular device,
a direction of travel of the second cellular device identified in the travel information associated with the second cellular device, or
a speed of travel of the second cellular device; and
transmitting, based on determining that the second cellular device is traveling on the path toward the first cellular device and at the speed that satisfies the speed threshold:
an instruction to the first cellular device to display a safety alert associated with the second cellular device, and
an instruction to the second cellular device to display a safety alert associated with the first cellular device.

16. The non-transitory computer-readable medium of claim 15, wherein the second threshold distance is based on a transportation mode of the first cellular device,
wherein the transportation mode is:
a vehicle transportation mode,
a cycling transportation mode, or
a pedestrian transportation mode.

17. The non-transitory computer-readable medium of claim 15, wherein the one or more instructions, when executed by the one or more processors, further cause the one or more processors to:
- determine to transmit the instruction to the first cellular device to display the safety alert associated with the second cellular device, and to transmit the instruction to the second cellular device to display the safety alert associated with the first cellular device, based on:
  - a transportation mode of the first cellular device being a cycling transportation mode or a pedestrian transportation mode, and
  - a transportation mode of the second cellular device being a vehicle transportation mode.

18. The non-transitory computer-readable medium of claim 15, wherein the location of the first cellular device comprises:
- a global navigation satellite system (GNSS) estimated location of the first cellular device;
- wherein the location of the second cellular device comprises:
  - a real-time kinematics (RTK) corrected GNSS location of the second cellular device; and
- wherein the one or more instructions, when executed by the one or more processors, are further to:
  - determine, based on the GNSS estimated location of the first cellular device, an RTK corrected location of the first cellular device.

19. The non-transitory computer-readable medium of claim 15, wherein the one or more instructions, when executed by the one or more processors, are further to:
- transmit an instruction to reduce a traveling speed of an autonomous vehicle associated with the second cellular device, or to modify a direction of travel of the autonomous vehicle.

20. The non-transitory computer-readable medium of claim 19, wherein the one or more instructions, when executed by the one or more processors, are further to:
- transmit an instruction to modify a direction of travel of the autonomous vehicle.

\* \* \* \* \*